US012652433B2

(12) United States Patent
Luo et al.

(10) Patent No.: US 12,652,433 B2
(45) Date of Patent: Jun. 9, 2026

(54) VIEWPORT SWITCH LATENCY REDUCTION IN LIVE STREAMING

(71) Applicant: Intel Corporation, Santa Clara, CA (US)

(72) Inventors: Ying Luo, Shanghai (CN); Xiaomin Chen, Shanghai (CN); Hongbo Lv, Shanghai (CN); Wenquan Mao, Shanghai (CN); Hua Zhang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/995,638

(22) PCT Filed: Sep. 23, 2022

(86) PCT No.: PCT/CN2022/120930
§ 371 (c)(1),
(2) Date: Jan. 16, 2025

(87) PCT Pub. No.: WO2024/060213
PCT Pub. Date: Mar. 28, 2024

(65) Prior Publication Data
US 2026/0025550 A1     Jan. 22, 2026

(51) Int. Cl.
*H04N 21/438*     (2011.01)
*H04N 21/218*     (2011.01)

(52) U.S. Cl.
CPC ..... *H04N 21/438* (2013.01); *H04N 21/21805* (2013.01)

(58) Field of Classification Search
CPC ...................... H04N 21/438; H04N 21/21805

USPC ......................................................... 725/105
See application file for complete search history.

(56) References Cited

U.S. PATENT DOCUMENTS

| | | | | |
|---|---|---|---|---|
| 10,762,710 B2 * | 9/2020 | Han | ............... | H04N 21/234345 |
| 10,944,971 B1 * | 3/2021 | Guardini | ............ | H04N 21/4728 |
| 11,019,409 B2 * | 5/2021 | Lohmar | ................. | H04L 65/611 |
| 2015/0262421 A1 * | 9/2015 | Bell | .......................... | G06T 3/40 |
| | | | | 345/423 |
| 2017/0013040 A1 | 1/2017 | Ponekker et al. | | |
| 2018/0041561 A1 | 2/2018 | Davies et al. | | |
| 2020/0128279 A1 | 4/2020 | Han et al. | | |

(Continued)

OTHER PUBLICATIONS

International Searching Authority, "Written Opinion of the International Searching Authority," issued in connection with International Patent Application No. PCT/CN2022/120930, mailed on Jun. 5, 2023, 5 pages.

(Continued)

*Primary Examiner* — Susan E. Hodges
(74) *Attorney, Agent, or Firm* — Hanley, Flight & Zimmerman, LLC

(57) ABSTRACT

This disclosure describes systems, methods, and devices related to enhanced viewport switching. A device may determine a view point change from a first segment to a second segment of a video stream, wherein each segment comprises a plurality of video chunks. The device may download a chunk location box at an end of each video chunk of the plurality of video chunks. The device may parse the chunk location box to update a chunk indexing table. The device may perform a completion check on a video chunk of the plurality of video chunks.

20 Claims, 8 Drawing Sheets

(56)            References Cited

U.S. PATENT DOCUMENTS

| | | | |
|---|---|---|---|
| 2021/0021806 A1* | 1/2021 | He | .................... H04N 13/158 |
| 2021/0058633 A1 | 2/2021 | Pettersson et al. | |

OTHER PUBLICATIONS

International Searching Authority, "International Search Report," issued in connection with International Patent Application No. PCT/CN2022/120930, mailed on Jun. 5, 2023, 3 pages.

International Searching Authority, "International Preliminary Report on Patentability," issued in connection with International Patent Application No. PCT/CN2022/120930, mailed on Mar. 1, 2025, 6 pages.

* cited by examiner

Same Media Samples Packaged in CMAF Chunks for low Latency Encode and Transfer

'moof' | 'mdat' | 'moof' | 'mdat' | 'moof' | 'mdat' | 'moof' | 'mdat' | 'moof' | 'mdat'

Encoder Output Time     Encoder Output Time     Encoder Output Time     Encoder Output Time     Encoder Output Time styp | prft | moof | mdat | cloc | prft | moof | mdat | cloc | ...

CMAF Chunk     CMAF Chunk 302     304

VIEWPORT SWITCH LATENCY REDUCTION IN LIVE STREAMING

RELATED APPLICATION(S)

This application corresponds to the U.S. national phase of International Patent Application No. PCT/CN2022/120930, which was filed on Sep. 23, 2022. Priority to International Patent Application No. PCT/CN2022/120930 is claimed. International Patent Application No. PCT/CN2022/120930 is incorporated herein by reference in its entirety.

BACKGROUND

Video coding can be a lossy process that sometimes results in latency and/or reduced quality during live streaming. Video coding standards are being developed to improve video quality.

Figure 1:
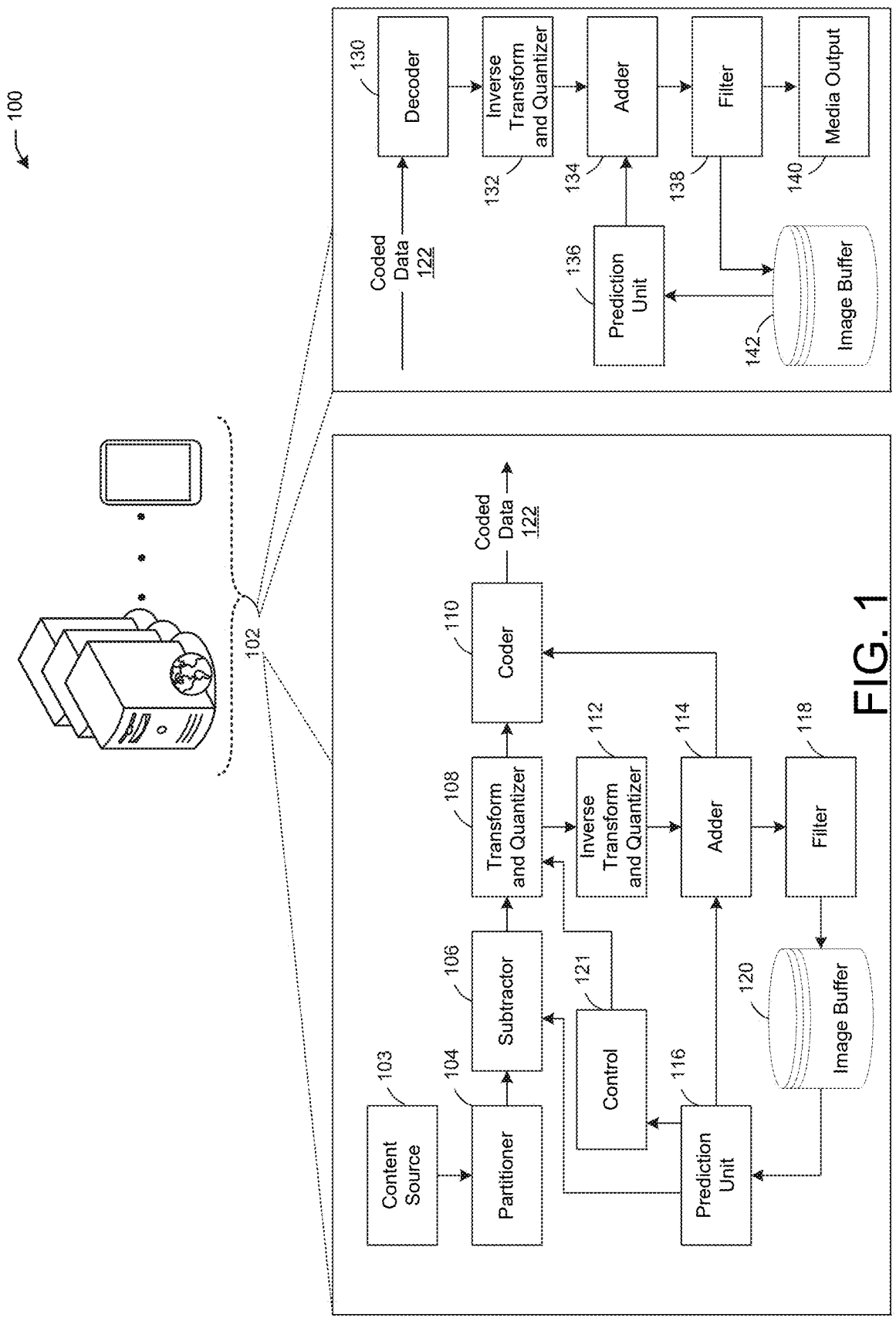
FIG. 1 depicts an example system illustrating components of encoding and decoding devices, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Currently, there has been an increased interest in the adoption of Virtual Reality (VR) and Augmented Reality (AR) in various fields to access the metaverse, such as entertainment, education, manufacturing, etc.

Network bandwidth and low latency tolerance are the key challenges in streaming high-fidelity immersive video streaming. Viewport-dependent streaming is now a popular way to deliver the field of view content at 8K or higher resolutions. It is a known issue that the end-to-end latency of MPEG Dynamic Adaptive Streaming over Hypertext Transfer Protocol-HTTP (DASH) is long and varies with the segmentation duration. In a real deployment with a content delivery network (CDN), such latency can be 20 seconds or longer. To solve the long end-to-end latency due to segmentation, the Common Media Application Format (CMAF) is a way to deliver live content based on chunked structure, where a chunk contains a sequential subset of samples from a segment. A segment is made up of one or more chunks, where a chunk is the smallest unit. Each chunk has three attributes: 1) chunk index, 2) chunk offset in the segment, and 3) chunk size. A segment is made up of one or more chunks, where a chunk is the smallest unit. A segment is made up of one or more chunks, where a chunk is the smallest unit. Another challenging part of latency is the viewport-switch latency in viewport-based streaming. This refers to the feedback time from the user's viewport-switching to the new-viewport content displaying on the client screen. In 360-degree video streaming, the viewport-switch latency often refers to motion-to-photon (MTP) latency, which may lead to motion sickness and the user will experience visual discomfort.

In order to reduce the viewport-switch latency, there is a need to download the missing chunks at the current timestamp in the new view as soon as possible in order to minimize latency and enhance the user experience.

The MP4 byte structure is composed of a series of boxes. Each box describes and contains data to build the MP4 container format. Boxes typically have a four-letter name. Each of these boxes has a different purpose, containing a bit of information and details on a specific piece of data. Some boxes describe the file type, and others can describe codec detail, picture resolution, frame rate, duration, sample sizes, and more. There are also boxes containing the encoded video and audio data too. In a video on demand (VOD) condition, there is a box named 'sidx' in the segment header to describe the chunk location to help locate the requested chunk. But in the live mode, the 'sidx' structure is not adopted since the chunk location information is updated in real-time.

In viewport-dependent immersive media live streaming using CMAF, there is a general method to locate the requested chunk when viewport switching happens. That is to download the tile segments in the changed view and then parse the segment's structure and locate the requested chunks according to the current timestamp. However, there are some disadvantages. First, it needs to download the redundant content for skipping and locating, which results in a waste of bandwidth. Second, the locating process is a linear complexity, and the worst time costing case will happen when the requested chunk is the last chunk in the tile segment, which causes a time waste.

In order to switch the content to the current viewport immediately when using CMAF chunk strategy, a new box 'cloc' (Chunk Location Box) definition is proposed to improve the efficiency to locate the requested current chunk to reduce the viewport-switch latency.

There are some solutions combining CMAF and viewport-dependent immersive video live streaming. The chunk structure is defined within a segment to enable latency enhancement of the stream, reducing the time elapsed between media packaging and its playback. However, there is no related method for reducing the MTP latency in viewport-dependent immersive video live streaming using CMAF.

Previous solutions about "CMAF+viewport-dependent immersive video live streaming" do not add any optimized method to reduce the MTP latency. In viewport-dependent 360 video live streaming using CMAF, there is a general method to locate the requested chunk when viewport switching happens. That is to download the tile segments in the changed view and then parse the segment's structure and locate the requested chunks according to the current timestamp. However, there are some disadvantages. First, it needs to download the redundant content for skipping and locating, which is a waste of bandwidth. Second, the locating process is linear complexity, and the worst time costing case will happen when the requested chunk is the last chunk in the tile segment, which is a time waste.

Example embodiments of the present disclosure relate to systems, methods, and devices for Method for viewport-dependent_immersive media live streaming using CMAF to reduce viewport-switch latency.

In one or more embodiments, an enhanced viewport switching system may facilitate a new box definition (Chunk Location box) referred to herein as 'cloc' to optimize the process of chunk locating and downloading in viewport-based immersive media CMAF streaming, which will reduce the viewport-switch latency and improve the user experience.

In one or more embodiments, an enhanced viewport switching system may facilitate a fast chunk locating and downloading strategy in viewport based CMAF streaming that improves the efficiency of the viewport switching process and reduces the viewport-switch latency. The viewport-switch latency is an important key factor for users' experience while performing live streaming.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 depicts an example system 100 illustrating components of encoding and decoding devices, according to some example embodiments of the present disclosure.

Referring to FIG. 1, the system 100 may include devices 102 having encoder and/or decoder components. As shown, the devices 102 may include a content source 103 that provides video and/or audio content (e.g., a camera or other image capture device, stored images/video, etc.). The content source 103 may provide media (e.g., video and/or audio) to a partitioner 104, which may prepare frames of the content for encoding. A subtractor 106 may generate a residual as explained further herein. A transform and quantizer 108 may generate and quantize transform units to facilitate encoding by a coder 110 (e.g., entropy coder). Transform and quantized data may be inversely transformed and inversely quantized by an inverse transform and quantizer 112. An adder 114 may compare the inversely transformed and inversely quantized data to a prediction block generated by a prediction unit 116, resulting in reconstructed frames. A filter 118 (e.g., in-loop filter for resizing/cropping, color conversion, de-interlacing, composition/blending, etc.) may revise the reconstructed frames from the adder 114, and may store the reconstructed frames in an image buffer 120 for use by the prediction unit 116. A control 121 may manage many encoding aspects (e.g., parameters) including at least the setting of a quantization parameter (QP) but could also include setting bitrate, rate distortion or scene characteristics, prediction and/or transform partition or block sizes, available prediction mode types, and best mode selection parameters, for example, based at least partly on data from the prediction unit 116. Using the encoding aspects, the transform and quantizer 108 may generate and quantize transform units to facilitate encoding by the coder 110, which may generate coded data 122 that may be transmitted (e.g., an encoded bitstream).

Still referring to FIG. 1, the devices 102 may receive coded data (e.g., the coded data 122) in a bitstream, and a decoder 130 may decode the coded data, extracting quantized residual coefficients and context data. An inverse transform and quantizer 132 may reconstruct pixel data based on the quantized residual coefficients and context data. An adder 134 may add the residual pixel data to a predicted block generated by a prediction unit 136. A filter 138 may filter the resulting data from the adder 134. The filtered data may be output by a media output 140, and also may be stored as reconstructed frames in an image buffer 142 for use by the prediction unit 136.

Referring to FIG. 1, the system 100 performs the methods of intra prediction disclosed herein, and is arranged to perform at least one or more of the implementations described herein including intra block copying. In various implementations, the system 100 may be configured to undertake video coding and/or implement video codecs according to one or more standards. Further, in various forms, video coding system 100 may be implemented as part of an image processor, video processor, and/or media processor and undertakes inter-prediction, intra-prediction, predictive coding, and residual prediction. In various implementations, system 500 may undertake video compression and decompression and/or implement video codecs according to one or more standards or specifications, such as, for example, H.264 (Advanced Video Coding, or AVC), VP8, H.265 (High Efficiency Video Coding or HEVC) and SCC extensions thereof, VP9, Alliance Open Media Version 1 (AV1), H.266 (Versatile Video Coding, or VVC), DASH (Dynamic Adaptive Streaming over HTTP), and others. Although system 100 and/or other systems, schemes or processes may be described herein, the present disclosure is not necessarily always limited to any particular video coding standard or specification or extensions thereof.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder. An encoder may have a decoder loop as described below.

For example, the system 100 may be an encoder where current video information in the form of data related to a sequence of video frames may be received to be compressed. By one form, a video sequence (e.g., from the content source 103) is formed of input frames of synthetic screen content such as from, or for, business applications such as word processors, power points, or spread sheets, computers, video games, virtual reality images, and so forth. By other forms, the images may be formed of a combination of synthetic screen content and natural camera captured images. By yet another form, the video sequence only may be natural camera captured video. The partitioner 104 may partition each frame into smaller more manageable units, and then compare the frames to compute a prediction. If a difference or residual is determined between an original block and prediction, that resulting residual is transformed and quantized, and then entropy encoded and transmitted in a bitstream, along with reconstructed frames, out to decoders or storage. To perform these operations, the system 100 may receive an input frame from the content source 103. The input frames may be frames sufficiently pre-processed for encoding.

The system 100 also may manage many encoding aspects including at least the setting of a quantization parameter (QP) but could also include setting bitrate, rate distortion or scene characteristics, prediction and/or transform partition or block sizes, available prediction mode types, and best mode selection parameters to name a few examples.

The output of the transform and quantizer 308 may be provided to the inverse transform and quantizer 112 to generate the same reference or reconstructed blocks, frames, or other units as would be generated at a decoder such as decoder 130. Thus, the prediction unit 116 may use the inverse transform and quantizer 112, adder 114, and filter 118 to reconstruct the frames.

The prediction unit 116 may perform inter-prediction including motion estimation and motion compensation, intra-prediction according to the description herein, and/or a combined inter-intra prediction. The prediction unit 116 may select the best prediction mode (including intra-modes) for a particular block, typically based on bit-cost and other factors. The prediction unit 116 may select an intra-prediction and/or inter-prediction mode when multiple such modes of each may be available. The prediction output of the prediction unit 116 in the form of a prediction block may be provided both to the subtractor 106 to generate a residual, and in the decoding loop to the adder 114 to add the prediction to the reconstructed residual from the inverse transform to reconstruct a frame.

The partitioner 104 or other initial units not shown may place frames in order for encoding and assign classifications to the frames, such as I-frame, B-frame, P-frame and so forth, where I-frames are intra-predicted. Otherwise, frames may be divided into slices (such as an I-slice) where each slice may be predicted differently. Thus, for HEVC or AV1 coding of an entire I-frame or I-slice, spatial or intra-prediction is used, and in one form, only from data in the frame itself.

In various implementations, the prediction unit 116 may perform an intra block copy (IBC) prediction mode and a non-IBC mode operates any other available intra-prediction mode such as neighbor horizontal, diagonal, or direct coding (DC) prediction mode, palette mode, directional or angle modes, and any other available intra-prediction mode. Other video coding standards, such as HEVC or VP9 may have different sub-block dimensions but still may use the IBC search disclosed herein. It should be noted, however, that the foregoing are only example partition sizes and shapes, the present disclosure not being limited to any particular partition and partition shapes and/or sizes unless such a limit is mentioned or the context suggests such a limit, such as with the optional maximum efficiency size as mentioned. It should be noted that multiple alternative partitions may be provided as prediction candidates for the same image area as described below.

The prediction unit 116 may select previously decoded reference blocks. Then comparisons may be performed to determine if any of the reference blocks match a current block being reconstructed. This may involve hash matching, SAD search, or other comparison of image data, and so forth. Once a match is found with a reference block, the prediction unit 116 may use the image data of the one or more matching reference blocks to select a prediction mode. By one form, previously reconstructed image data of the reference block is provided as the prediction, but alternatively, the original pixel image data of the reference block could be provided as the prediction instead. Either choice may be used regardless of the type of image data that was used to match the blocks.

The predicted block then may be subtracted at subtractor 106 from the current block of original image data, and the resulting residual may be partitioned into one or more transform blocks (TUs) so that the transform and quantizer 108 can transform the divided residual data into transform coefficients using discrete cosine transform (DCT) for example. Using the quantization parameter (QP) set by the system 100, the transform and quantizer 108 then uses lossy resampling or quantization on the coefficients. The frames and residuals along with supporting or context data block size and intra displacement vectors and so forth may be entropy encoded by the coder 110 and transmitted to decoders.

In one or more embodiments, a system 100 may have, or may be, a decoder, and may receive coded video data in the form of a bitstream and that has the image data (chroma and luma pixel values) and as well as context data including residuals in the form of quantized transform coefficients and the identity of reference blocks including at least the size of the reference blocks, for example. The context also may include prediction modes for individual blocks, other partitions such as slices, inter-prediction motion vectors, partitions, quantization parameters, filter information, and so forth. The system 100 may process the bitstream with an entropy decoder 130 to extract the quantized residual coefficients as well as the context data. The system 100 then may use the inverse transform and quantizer 132 to reconstruct the residual pixel data.

The system 100 then may use an adder 134 (along with assemblers not shown) to add the residual to a predicted block. The system 100 also may decode the resulting data using a decoding technique employed depending on the coding mode indicated in syntax of the bitstream, and either a first path including a prediction unit 136 or a second path that includes a filter 138. The prediction unit 136 performs intra-prediction by using reference block sizes and the intra displacement or motion vectors extracted from the bitstream, and previously established at the encoder. The prediction unit 136 may utilize reconstructed frames as well as inter-prediction motion vectors from the bitstream to reconstruct a predicted block. The prediction unit 136 may set the correct prediction mode for each block, where the prediction mode may be extracted and decompressed from the compressed bitstream.

In one or more embodiments, the coded data 122 may include both video and audio data. In this manner, the system 100 may encode and decode both audio and video.

It is understood that the above descriptions are for purposes of illustration and are not meant to be limiting.

Figure 2:
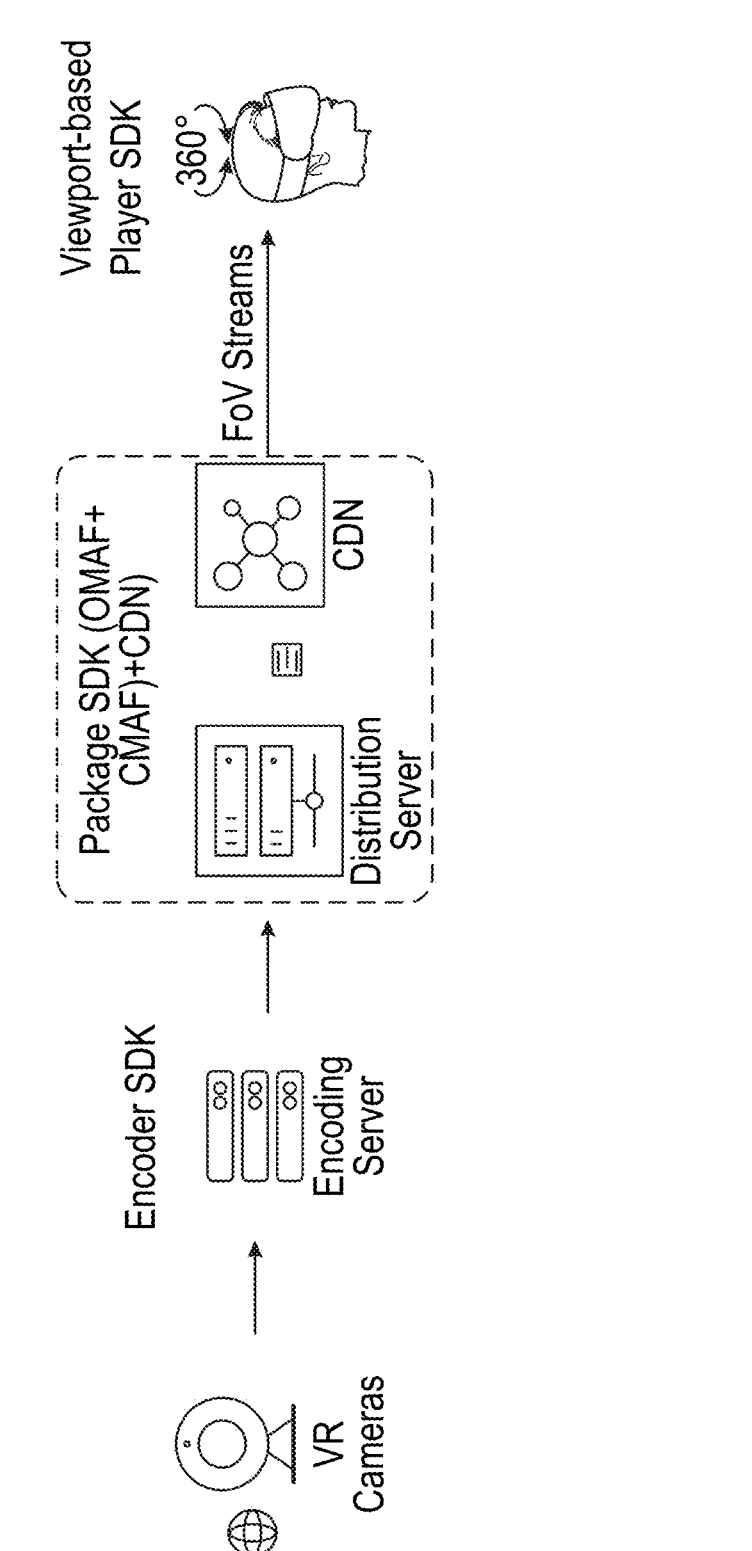
FIGS. 2-6 depict illustrative schematic diagrams for enhanced viewport switching, in accordance with one or more example embodiments of the present disclosure.

FIG. 2 depicts an illustrative schematic diagram 200 for enhanced viewport switching, in accordance with one or more example embodiments of the present disclosure.

Referring to FIG. 2, there is shown a system framework for viewport based CMAF live streaming. The viewport based CMAF streaming system architecture contains a live capturing camera, encoder software development kit (SDK), live packaging SDK based on CMAF standards, CDN distributor, and a viewport-based player.

When live packaging SDK completes a chunk data packing, it will send the HTTP PUT request to the origin server in CDN. As the player requests the content within the user's viewport, the edge server distributes the field of view (FoV) stream to the player for content display. The process latency is called "Packager-Display latency," which is defined in DASH Industry Forum (DASH-IF).

In this tile-based streaming according to the user's viewport, the MTP latency inevitably happens when the viewport suddenly changes to other views, which could lead to motion sickness and experience visual discomfort. For example, in mixed-resolution immersive viewport-based streaming, when blurred content or low-resolution content occurs in the viewport, the recovery duration from detecting low-resolution content to watching the high-resolution content is called MTP latency.

MTP latency is a core factor of the user's experience in tile-based immersive streaming.

In one or more embodiments, an enhanced viewport switching system may improve the efficiency to locate the requested current chunk to reduce the MTP latency when enabling the CMAF chunk strategy.

Figures 3A, 3B:
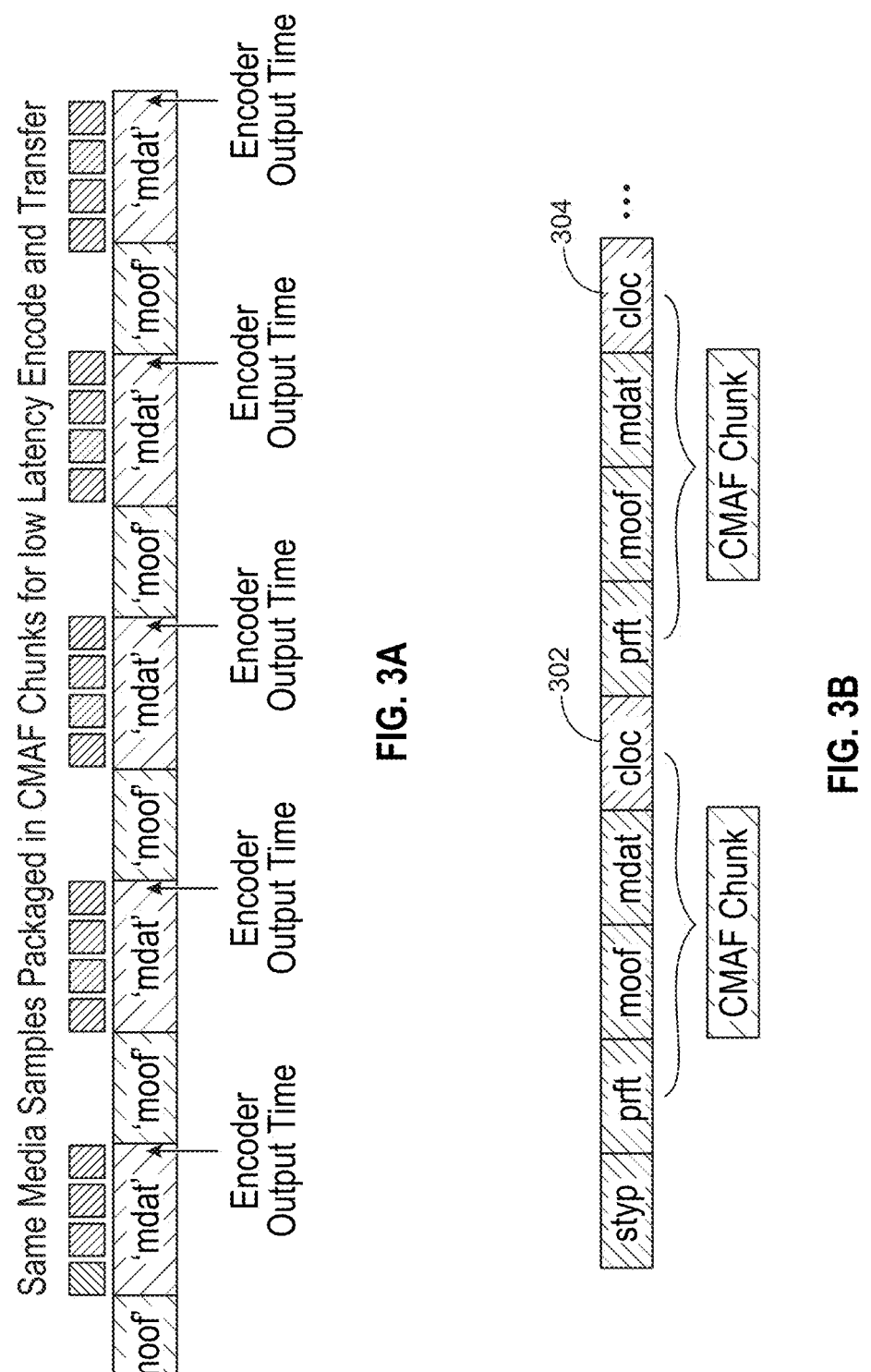

FIGS. 3A-3B depict illustrative schematic diagrams for enhanced viewport switching, in accordance with one or more example embodiments of the present disclosure.

Referring to FIG. 3A, there is shown a typical CMAF chunk structure, while FIG. 3B, there is shown a CMAF chunk structure with a new 'cloc' box (Chunk Location box) (e.g., cloc boxes 302 and 304).

In one or more embodiments, an enhanced viewport switching system may facilitate a 'cloc' box definition and chunk live packaging. This new 'cloc' box) (e.g., cloc boxes 302 and 304) improves the chunk indexing and locating efficiency. In one or more embodiments, an enhanced viewport switching system may define a new ISO base media file format (ISOBMFF) box 'cloc'. It should be understood that the ISOBMFF is a container file format that defines a general structure for files that contain time-based multimedia data such as video and audio.

The 'cloc' box definition is shown in Table 1:

determined, and 2) the capacity of the rest elements is reversed to keep the values at 0. When a chunk is generated, the corresponding element values are updated.

A progressive method is used to write chunks. The packager will send a PUT request to the CDN origin server once a chunk is generated which makes sure the chunk can be downloaded as soon as possible to the client thus reducing the end-to-end latency.

Notes that 'prft' (Producer Reference Time Box) is used to supply relative wall-clock time at which chunk is produced, which can provide the client with information to enable consumption and production to calculate "Packager-Display latency".

Figure 4:
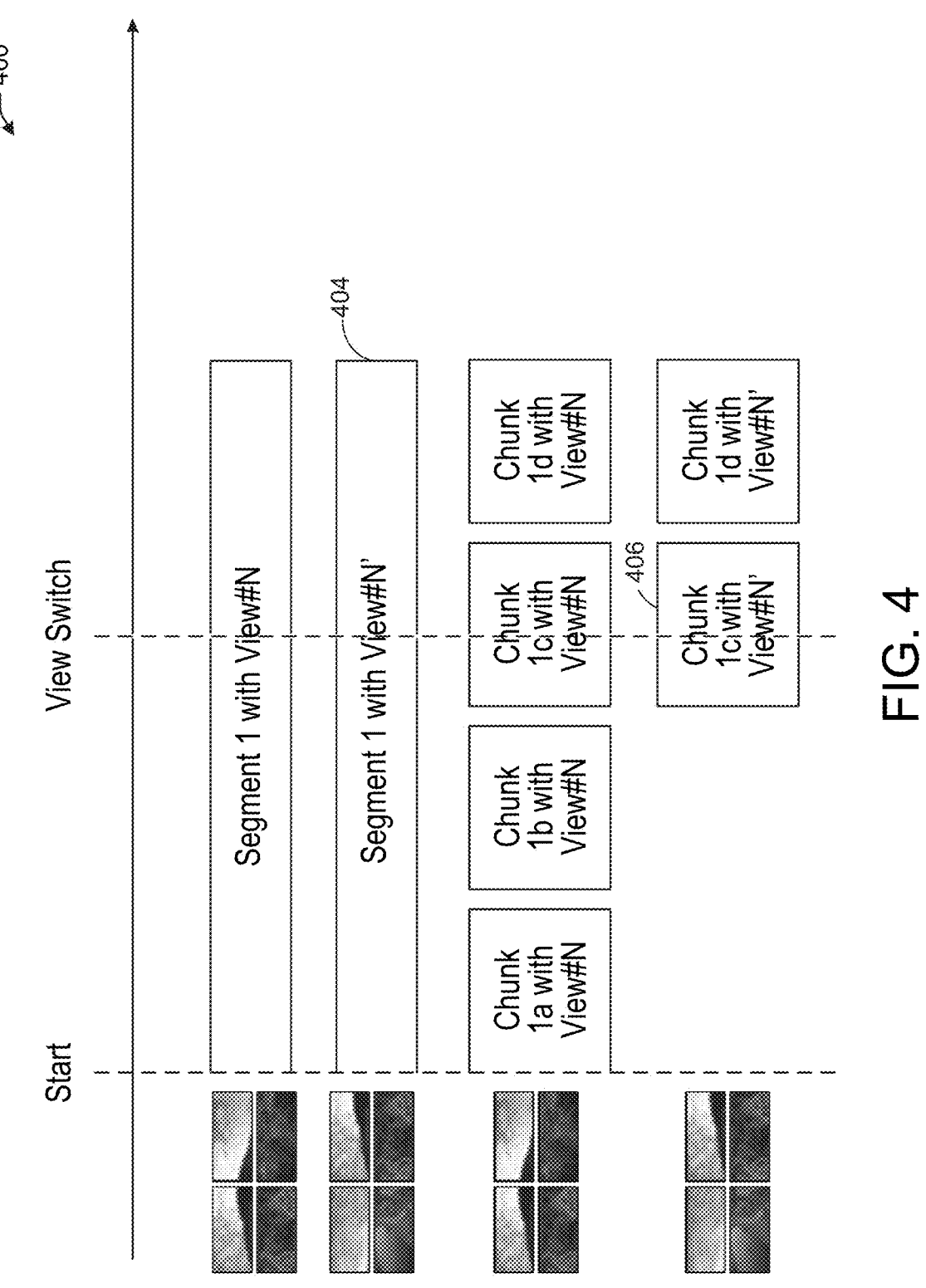

FIG. 4 depicts an illustrative schematic diagram for enhanced viewport switching, in accordance with one or more example embodiments of the present disclosure.

Referring to FIG. 4, there is shown a downloading scheme 400 when a view switches from a first segment to a second segment if CMAF is ON or OFF.

In one or more embodiments, an enhanced viewport switching system may use 'cloc' information to reduce MTP latency. In viewport-based tile streaming, if the viewport keeps not moving, the tiles in the view will not change. If the viewport switches to another view, the tiles in the current view need to be downloaded from the corresponding chunk. For example, as shown in FIG. 4, the view switch happens in the middle of watching the content of segment 1. If CMAF is disabled (OFF), the entire tile segments in View #N' 404 need to be downloaded, parsed, and sought to the correct frame, and finally displayed according to the timeline. If CMAF is enabled (ON), when the view switch occurs in the middle of watching the content of chunk 1c, only the tile chunks after the index of 1c in View #N' 406 need to be downloaded.

```
Definition: Chunk Location Box
Box Type: 'cloc'
Container: File
Mandatory: No
Quantity:   Zero or more
Syntax:
aligned(8) class ChunkLocationBox extends FullBox('cloc', version, 0) {
    unsigned int (16) chunk_count;
    for (i = 1; i <= chunk_count; i++)
    {
       unsigned int (16) chunk_index;
       unsigned int (32) chunk_offset;
       unsigned int (32) chunk_size;
    }
}
Semantics:
    chunk_count is the total number of chunks in the segment.
    chunk_index provides the index of the chunk within the segment and begins from
0.
    chunk_offset is the distance in bytes from the beginning of the segment to the first
byte of current chunk.
    chunk_size is the distance in bytes from the beginning of current chunk to the first
byte of the next chunk or to the end of the segment.
```

The comparison between a typical CMAF chunk structure and the chunk structure with 'cloc' is shown in FIGS. 3A and 3B. FIG. 3A shows a typical CMAF chunk structure and in FIG. 3B, 'cloc' is appended to the end of the chunk for easy access and retrieval to minimize the latency issues discussed above.

Since a chunk_count is a fixed value before live packing, the box length for 'cloc' is determined. The initialization of 'cloc' is that: 1) the value of chunk_count and box length is FIG. 5 depicts an illustrative schematic diagram 500 for enhanced viewport switching, in accordance with one or more example embodiments of the present disclosure.

Figure 5:
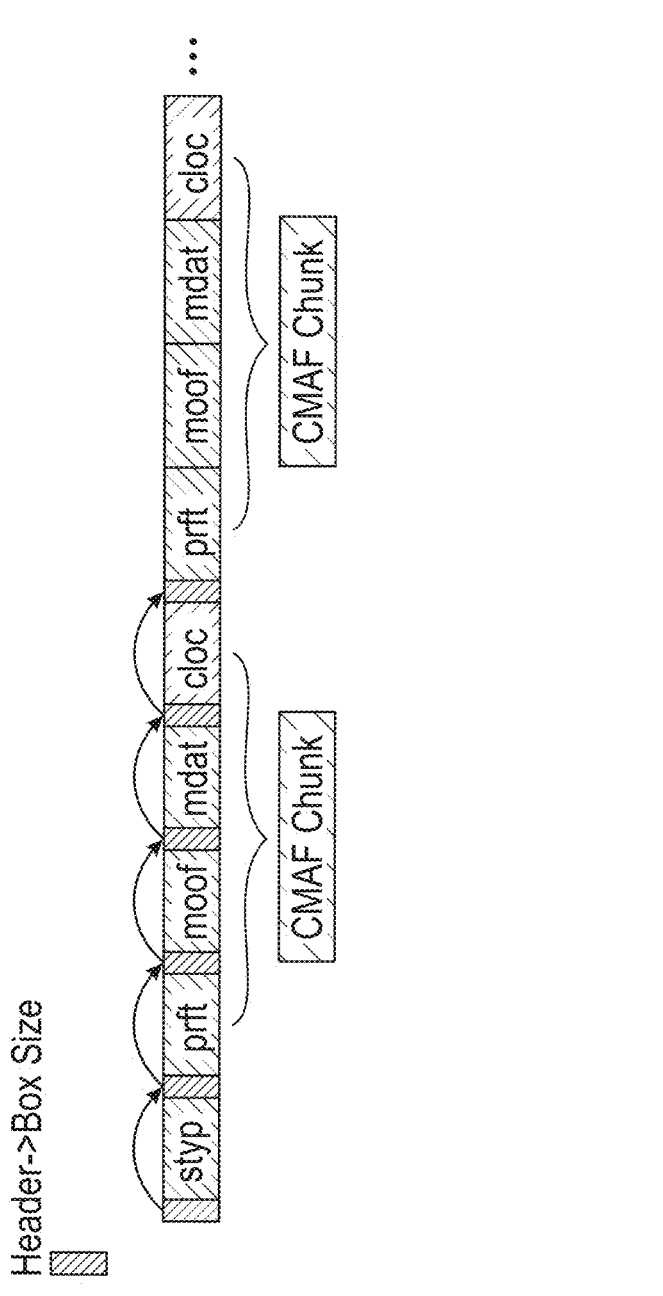

Referring to FIG. 5, there is shown a general method to locate the requested chunk. For example, fast locating chunk 1c in tile segments in View #N'. As shown in FIG. 5, the requested chunk can be located by the way of getting and skipping the boxes' sizes which are parsed in the box header from the beginning of the segment. And then the offset and size of the requested chunk will be obtained for HTTP byte-range downloading.

Figure 6:
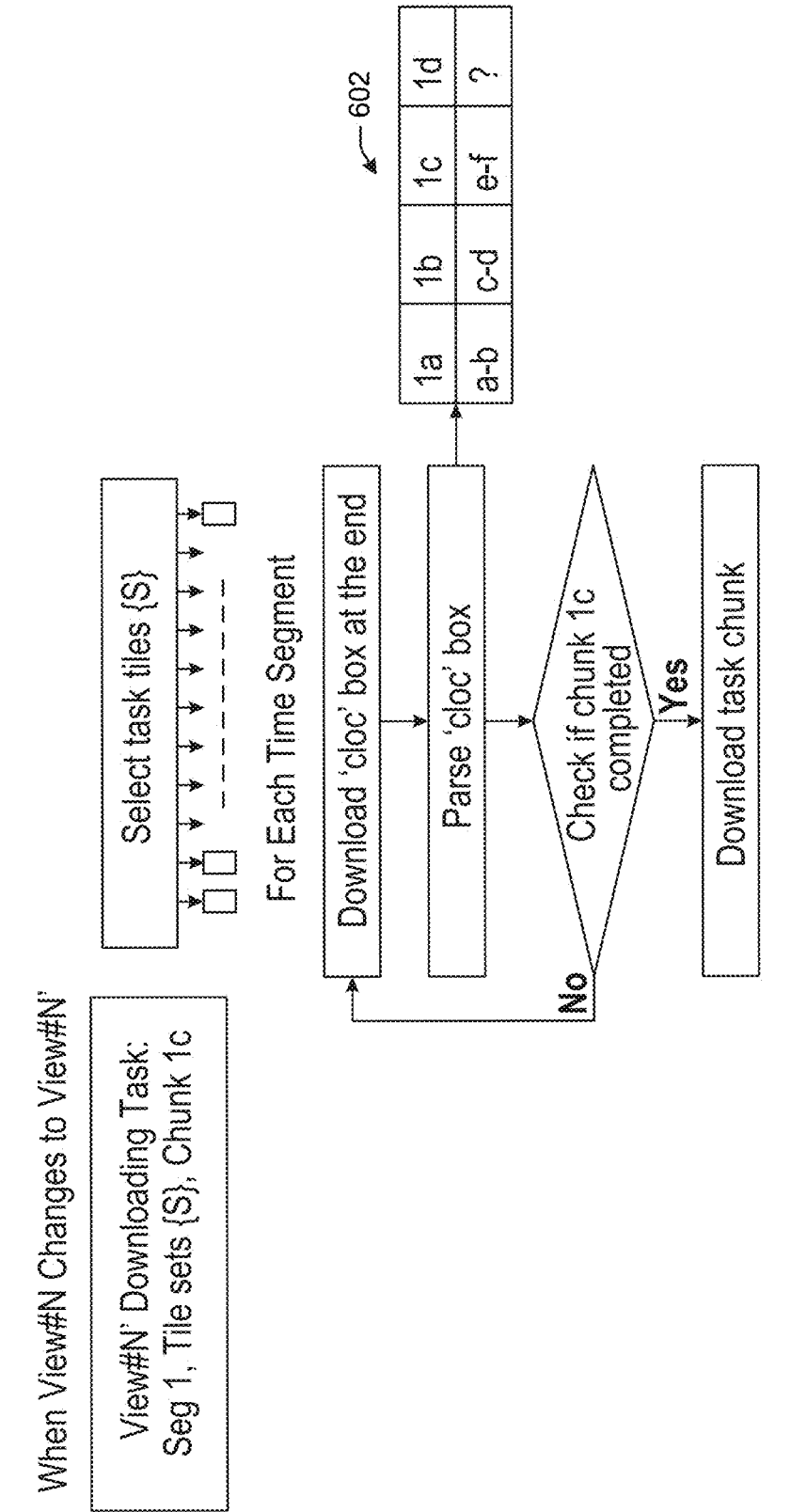

FIG. 6 depicts an illustrative schematic diagram for enhanced viewport switching, in accordance with one or more example embodiments of the present disclosure.

Referring to FIG. 6, there is shown a fast chunk locating strategy using 'cloc' information.

There are several disadvantages to the general method. First, it needs to download the redundant tile content for skipping and locating, which is a waste of bandwidth. Second, the seeking process is a linear complexity, and the worst time costing case will happen when the requested chunk is the last in the tile segment, which is cause a time waste.

A video stream is divided into multiple segments and based on CMAF, each segment is divided into multiple chunks. Select the requested segment and then download the cloc box at the end of each segmented part (e.g., each chunk) and parse the cloc box. The size of the 'cloc' box is fixed, therefore, it can be downloaded in the byte range. The video streaming content may be partitioned into multiple tiles (segments).

Looking at the chunk indexing table 602 and FIG. 6, there are shown indices 1*a*, 1*b*, 1*c*, and 1*d*, which represent the IDs of the chunks. In those IDs, "1" represents the segment number, and "a" represents the chunk number. The ranges a-b, c-d, e-f, represent the range of bytes of chunks 1*a*, 1*b*, 1*c*, in the tile segment, respectively. Also shown in FIG. 6 that 1*d* has a "?", indicating that the chunk 1*d* is not completed. When the cloc data is parsed, the chunk indexing table 602 may be generated and determine if 1*c*, the range of the bytes, is completed in the server. If true, then the client is able to download the chunk and play it. In the example of FIG. 6, chunk 1*d* appears to not be completed, so the range is not present because it was generated in the server. During live streaming, the chunk may not be ready but it is always on the table. If it is not ready that means it is in the generating process and the step for checking whether the chunk is complete would occur and the 'cloc' box would need to be downloaded again at the end of each chunk.

In one or more embodiments, an enhanced viewport switching system may define a 'cloc' box structure to optimize this chunk locating issue. Referring back to FIG. 4, when View #N changes to View #N' in the middle of watching the content of chunk 1*c*, the downloading task is to download all the tile segments from the start of chunk 1*c* in View #N'.

The fast chunk locating strategy using 'cloc' information is shown in FIG. 6. For each tile segment in View #N', an enhanced viewport switching system may download the 'cloc' box content at the end of each segment file and then parse the 'cloc' box. The information in the 'cloc' will tell the status of each chunk including downloading status, chunk index, chunk offset and chunk size. After obtaining the 'cloc' information, the chunk indexing table 602 can be set up to determine if chunk 1*c* is ready on the server or not. If yes, then download the requested chunk in byte-range mode. Through this strategy, the 'cloc' helps to locate the requested chunk faster in constant complexity, even when the requested chunk is the last in the tile segment.

During experimentation of the fast chunk locating strategy using 'cloc' information, the MTP latency was around 200 ms, and Packager-Display latency is around 100 ms, which improved the user's experience. Without utilizing the fast chunk locating strategy using 'cloc' information, the latency for locating the requested chunk contains redundant content for downloading, box parsing, and locating, which are extra parts for MTP latency. So the usage of 'cloc' will effectively optimize the MTP latency.

It is understood that the above descriptions are for purposes of illustration and are not meant to be limiting.

Figure 7:
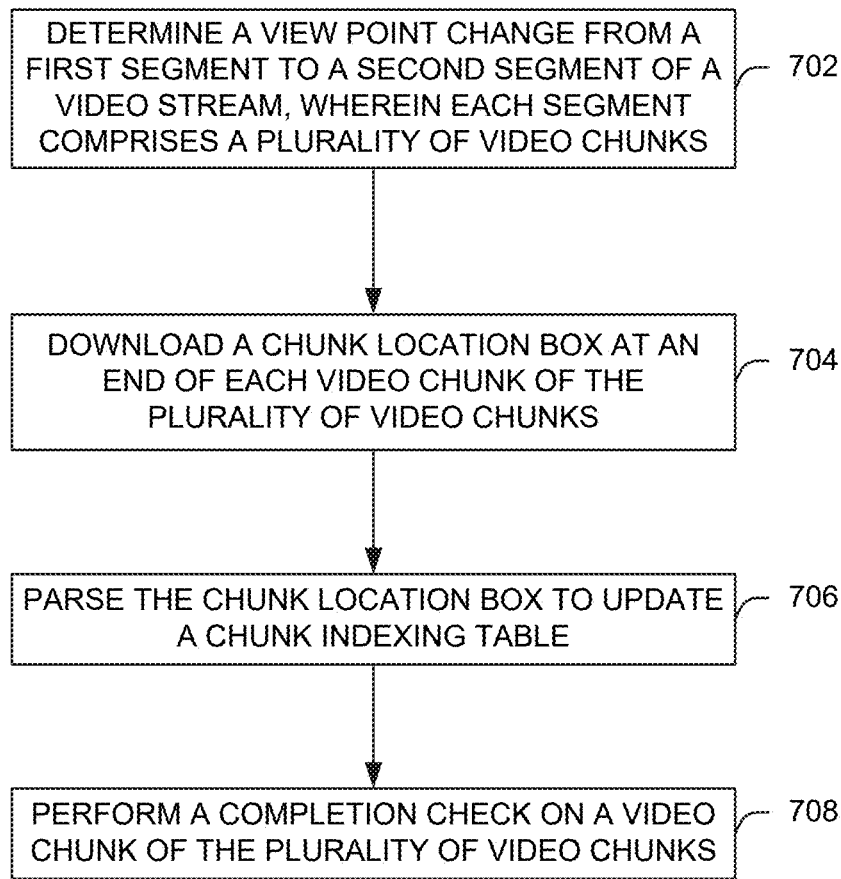
FIG. 7 illustrates a flow diagram of a process for an illustrative enhanced viewport switching system, in accordance with one or more example embodiments of the present disclosure.

FIG. 7 illustrates a flow diagram of a process 700 for an enhanced viewport switching system, in accordance with one or more example embodiments of the present disclosure.

At block 702, a device may determine a viewpoint change from a first segment to a second segment of a video stream, wherein each segment comprises a plurality of video chunks.

At block 704, the device may download a chunk location box at an end of each video chunk of the plurality of video chunks.

At block 706, the device may parse the chunk location box to update a chunk indexing table.

At block 708, the device may perform a completion check on a video chunk of the plurality of video chunks.

It is understood that the above descriptions are for purposes of illustration and are not meant to be limiting.

Figure 8:
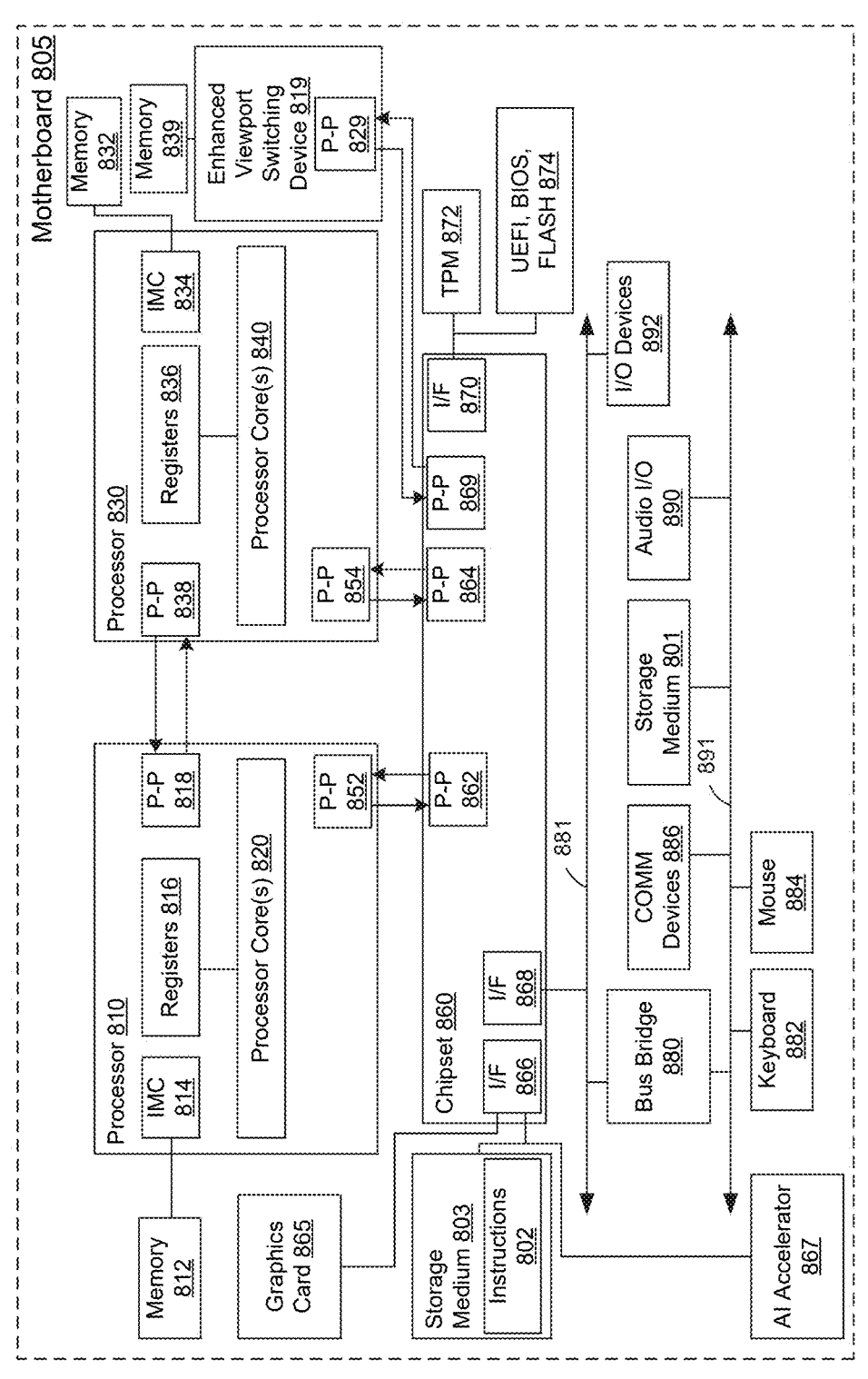
FIG. 8 is a block diagram illustrating an example of a computing device or computing system upon which any of one or more techniques (e.g., methods) may be performed, in accordance with one or more example embodiments of the present disclosure.

FIG. 8 illustrates an embodiment of an exemplary system 800, in accordance with one or more example embodiments of the present disclosure.

In various embodiments, the computing system 800 may comprise or be implemented as part of an electronic device.

In some embodiments, the computing system 800 may be representative, for example, of a computer system that implements one or more components of FIG. 1.

The embodiments are not limited in this context. More generally, the computing system 800 is configured to implement all logic, systems, processes, logic flows, methods, equations, apparatuses, and functionality described herein and with reference to FIGS. 1-6.

The system 800 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, a handheld device such as a personal digital assistant (PDA), or other devices for processing, displaying, or transmitting information. Similar embodiments may comprise, e.g., entertainment devices such as a portable music player or a portable video player, a smart phone or other cellular phones, a telephone, a digital video camera, a digital still camera, an external storage device, or the like. Further embodiments implement larger scale server configurations. In other embodiments, the system 800 may have a single processor with one core or more than one processor. Note that the term "processor" refers to a processor with a single core or a processor package with multiple processor cores.

In at least one embodiment, the computing system 800 is representative of one or more components of FIG. 1. More generally, the computing system 800 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary system 800. For example, a component can be, but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 800 comprises a motherboard 805 for mounting platform components. The motherboard 805 is a point-to-point interconnect platform that includes a processor 810, a processor 830 coupled via a point-to-point interconnects as an Ultra Path Interconnect (UPI), and an enhanced viewport switching device 819. In other embodiments, the system 800 may be of another bus architecture, such as a multi-drop bus. Furthermore, each of processors 810 and 830 may be processor packages with multiple processor cores. As an example, processors 810 and 830 are shown to include processor core(s) 820 and 840, respectively. While the system 800 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 810 and the chipset 860. Some platforms may include additional components and some platforms may only include sockets to mount the processors and/or the chipset.

The processors 810 and 830 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 810, and 830.

The processor 810 includes an integrated memory controller (IMC) 814, registers 816, and point-to-point (P-P) interfaces 818 and 852. Similarly, the processor 830 includes an IMC 834, registers 836, and P-P interfaces 838 and 854. The IMC's 814 and 834 couple the processors 810 and 830, respectively, to respective memories, a memory 812 and a memory 832. The memories 812 and 832 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 812 and 832 locally attach to the respective processors 810 and 830.

In addition to the processors 810 and 830, the system 800 may include an enhanced viewport switching device 819.

The enhanced viewport switching device 819 may be connected to chipset 860 by means of P-P interfaces 829 and 869. The enhanced viewport switching device 819 may also be connected to a memory 839. In some embodiments, the enhanced viewport switching device 819 may be connected to at least one of the processors 810 and 830. In other embodiments, the memories 812, 832, and 839 may couple with the processor 810 and 830, and the enhanced viewport switching device 819 via a bus and shared memory hub.

System 800 includes chipset 860 coupled to processors 810 and 830. Furthermore, chipset 860 can be coupled to storage medium 803, for example, via an interface (I/F) 866. The I/F 866 may be, for example, a Peripheral Component Interconnect-enhanced (PCI-e). The processors 810, 830, and the enhanced viewport switching device 819 may access the storage medium 803 through chipset 860.

Storage medium 803 may comprise any non-transitory computer-readable storage medium or machine-readable storage medium, such as an optical, magnetic or semiconductor storage medium. In various embodiments, storage medium 803 may comprise an article of manufacture. In some embodiments, storage medium 803 may store computer-executable instructions, such as computer-executable instructions 802 to implement one or more of processes or operations described herein, (e.g., process 700 of FIG. 7). The storage medium 803 may store computer-executable instructions for any equations depicted above. The storage medium 803 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 810 couples to a chipset 860 via P-P interfaces 852 and 862 and the processor 830 couples to a chipset 860 via P-P interfaces 854 and 864. Direct Media Interfaces (DMIs) may couple the P-P interfaces 852 and 862 and the P-P interfaces 854 and 864, respectively. The DMI may be a high-speed interconnect that facilitates, e.g., eight Giga Transfers per second (GT/s) such as DMI 3.0. In other embodiments, the processors 810 and 830 may interconnect via a bus.

The chipset 860 may comprise a controller hub such as a platform controller hub (PCH). The chipset 860 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 860 may comprise more than one controller hub such as a chipset with a memory controller hub, a graphics controller hub, and an input/output (I/O) controller hub.

In the present embodiment, the chipset 860 couples with a trusted platform module (TPM) 872 and the UEFI, BIOS, Flash component 874 via an interface (I/F) 870. The TPM 872 is a dedicated microcontroller designed to secure hardware by integrating cryptographic keys into devices. The UEFI, BIOS, Flash component 874 may provide pre-boot code.

Furthermore, chipset 860 includes the I/F 866 to couple chipset 860 with a high-performance graphics engine, graphics card 865. In other embodiments, the system 800 may include a flexible display interface (FDI) between the processors 810 and 830 and the chipset 860. The FDI interconnects a graphics processor core in a processor with the chipset 860.

Various I/O devices 892 couple to the bus 881, along with a bus bridge 880 which couples the bus 881 to a second bus 891 and an I/F 868 that connects the bus 881 with the chipset 860. In one embodiment, the second bus 891 may be a low pin count (LPC) bus. Various devices may couple to the second bus 891 including, for example, a keyboard 882, a mouse 884, communication devices 886, a storage medium 801, and an audio I/O 890.

The artificial intelligence (AI) accelerator 867 may be circuitry arranged to perform computations related to AI. The AI accelerator 867 may be connected to storage medium 803 and chipset 860. The AI accelerator 867 may deliver the processing power and energy efficiency needed to enable abundant-data computing. The AI accelerator 867 is a class of specialized hardware accelerators or computer systems designed to accelerate artificial intelligence and machine learning applications, including artificial neural networks and machine vision. The AI accelerator 867 may be applicable to algorithms for robotics, internet of things, other data-intensive and/or sensor-driven tasks.

Many of the I/O devices 892, communication devices 886, and the storage medium 801 may reside on the motherboard 805 while the keyboard 882 and the mouse 884 may be add-on peripherals. In other embodiments, some or all the I/O devices 892, communication devices 886, and the storage medium 801 are add-on peripherals and do not reside on the motherboard 805.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, the inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The following examples pertain to further embodiments.

Example 1 may include a device comprising processing circuitry coupled to storage, the processing circuitry configured to: determine a view point change from a first segment to a second segment of a video stream, wherein each segment comprises a plurality of video chunks; download a chunk location box at an end of each video chunk of the plurality of video chunks; parse the chunk location box to update a chunk indexing table; and perform a completion check on a video chunk of the plurality of video chunks.

Example 2 may include the device of example 1 and/or some other example herein, wherein the processing circuitry may be further configured to: determine that the video chunk of the plurality of video chunks may be not completed; and download the chunk location box at the end of each video chunk of the plurality of video chunk.

Example 3 may include the device of example 1 and/or some other example herein, wherein the processing circuitry may be further configured to: determined that the video chunk of the plurality of video chunk may be completed; and download the video chunk.

Example 4 may include the device of example 1 and/or some other example herein, wherein the chunk location box comprises a chunk index, a chunk offset, and a chunk size.

Example 5 may include the device of example 1 and/or some other example herein, wherein the chunk location box assigns a range of bytes to a chunk index, wherein the range of bytes indicates the location and size of the video chunk.

Example 6 may include the device of example 5 and/or some other example herein, wherein the completion check on the video chunk may be based on the range of bytes assigned to the chunk index.

Example 7 may include the device of example 5 and/or some other example herein, wherein the video chunk may be determined to be not completed based on the range of bytes being unavailable in the chunk indexing table.

Example 8 may include the device of example 5 and/or some other example herein, wherein the video chunk may be determined to be completed based on the range of bytes being available in the chunk indexing table.

Example 9 may include the device of example 1 and/or some other example herein, wherein the video chunk may be a Common Media Application Format (CMAF) video chunk.

Example 10 may include a non-transitory computer-readable medium storing computer-executable instructions which when executed by one or more processors result in performing operations comprising: determining a view point change from a first segment to a second segment of a video stream, wherein each segment comprises a plurality of video chunks; downloading a chunk location box at an end of each video chunk of the plurality of video chunks; parsing the chunk location box to update a chunk indexing table; and performing a completion check on a video chunk of the plurality of video chunks.

Example 11 may include the non-transitory computer-readable medium of example 10 and/or some other example herein, wherein the operations further comprise: determining that the video chunk of the plurality of video chunks may be not completed; and download the chunk location box at the end of each video chunk of the plurality of video chunk.

Example 12 may include the non-transitory computer-readable medium of example 10 and/or some other example herein, wherein the operations further comprise: determining that the video chunk of the plurality of video chunk may be completed; and downloading the video chunk.

Example 13 may include the non-transitory computer-readable medium of example 10 and/or some other example herein, wherein the chunk location box comprises a chunk index, a chunk offset, and a chunk size.

Example 14 may include the non-transitory computer-readable medium of example 10 and/or some other example herein, wherein the chunk location box assigns a range of bytes to a chunk index, wherein the range of bytes indicates the location and size of the video chunk.

Example 15 may include the non-transitory computer-readable medium of example 14 and/or some other example herein, wherein the completion check on the video chunk may be based on the range of bytes assigned to the chunk index.

Example 16 may include the non-transitory computer-readable medium of example 14 and/or some other example herein, wherein the video chunk may be determined to be not completed based on the range of bytes being unavailable in the chunk indexing table.

Example 17 may include the non-transitory computer-readable medium of example 14 and/or some other example herein, wherein the video chunk may be determined to be completed based on the range of bytes being available in the chunk indexing table.

Example 18 may include the non-transitory computer-readable medium of example 10 and/or some other example herein, wherein the video chunk may be a Common Media Application Format (CMAF) video chunk.

Example 19 may include a method comprising: determining a view point change from a first segment to a second segment of a video stream, wherein each segment comprises a plurality of video chunks; downloading a chunk location box at an end of each video chunk of the plurality of video chunks; parsing the chunk location box to update a chunk indexing table; and performing a completion check on a video chunk of the plurality of video chunks.

Example 20 may include the method of example 19 and/or some other example herein, further comprising: determining that the video chunk of the plurality of video chunks may be not completed; and download the chunk location box at the end of each video chunk of the plurality of video chunk.

Example 21 may include the method of example 19 and/or some other example herein, further comprising: determining that the video chunk of the plurality of video chunk may be completed; and download the video chunk.

Example 22 may include the method of example 19 and/or some other example herein, wherein the chunk location box comprises a chunk index, a chunk offset, and a chunk size.

Example 23 may include the method of example 19 and/or some other example herein, wherein the chunk location box assigns a range of bytes to a chunk index, wherein the range of bytes indicates the location and size of the video chunk.

Example 24 may include the method of example 23 and/or some other example herein, wherein the completion check on the video chunk may be based on the range of bytes assigned to the chunk index.

Example 25 may include the method of example 23 and/or some other example herein, wherein the video chunk may be determined to be not completed based on the range of bytes being unavailable in the chunk indexing table.

Example 26 may include the method of example 23 and/or some other example herein, wherein the video chunk may be determined to be completed based on the range of bytes being available in the chunk indexing table.

Example 27 may include the method of example 19 and/or some other example herein, wherein the video chunk may be a Common Media Application Format (CMAF) video chunk.

Example 28 may include an apparatus comprising means for: determining a view point change from a first segment to a second segment of a video stream, wherein each segment comprises a plurality of video chunks; downloading a chunk location box at an end of each video chunk of the plurality of video chunks; parsing the chunk location box to update a chunk indexing table; and performing a completion check on a video chunk of the plurality of video chunks.

Example 29 may include the apparatus of example 28 and/or some other example herein, further comprising: determining that the video chunk of the plurality of video chunks may be not completed; and download the chunk location box at the end of each video chunk of the plurality of video chunk.

Example 30 may include the apparatus of example 28 and/or some other example herein, further comprising: determining that the video chunk of the plurality of video chunk may be completed; and download the video chunk.

Example 31 may include the apparatus of example 28 and/or some other example herein, wherein the chunk location box comprises a chunk index, a chunk offset, and a chunk size.

Example 32 may include the apparatus of example 28 and/or some other example herein, wherein the chunk location box assigns a range of bytes to a chunk index, wherein the range of bytes indicates the location and size of the video chunk.

Example 33 may include the apparatus of example 32 and/or some other example herein, wherein the completion check on the video chunk may be based on the range of bytes assigned to the chunk index.

Example 34 may include the apparatus of example 32 and/or some other example herein, wherein the video chunk may be determined to be not completed based on the range of bytes being unavailable in the chunk indexing table.

Example 35 may include the apparatus of example 32 and/or some other example herein, wherein the video chunk may be determined to be completed based on the range of bytes being available in the chunk indexing table.

Example 36 may include the apparatus of example 28 and/or some other example herein, wherein the video chunk may be a Common Media Application Format (CMAF) video chunk.

Example 37 may include one or more non-transitory computer-readable media comprising instructions to cause an electronic device, upon execution of the instructions by one or more processors of the electronic device, to perform one or more elements of a method described in or related to any of examples 1-36, or any other method or process described herein Example 38 may include an apparatus comprising logic, modules, and/or circuitry to perform one or more elements of a method described in or related to any of examples 1-37, or any other method or process described herein.

Example 39 may include a method, technique, or process as described in or related to any of examples 1-37, or portions or parts thereof.

Example 40 may include an apparatus comprising: one or more processors and one or more computer readable media comprising instructions that, when executed by the one or more processors, cause the one or more processors to perform the method, techniques, or process as described in or related to any of examples 1-37, or portions thereof.

Example 41 may include a method of communicating in a wireless network as shown and described herein.

Example 42 may include a system for providing wireless communication as shown and described herein.

Example 43 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system comprising:
   at least one memory;
   computer-executable instructions; and
   at least one processor circuit to be programmed based on the computer-executable instructions to:
      determine a viewpoint change from a first segment to a second segment of a video stream, wherein each segment includes a plurality of video chunks;
      download a chunk location box at an end of each video chunk of the plurality of video chunks;
      parse the chunk location box to update a chunk indexing table; and
      perform a completion check on a video chunk of the plurality of video chunks.

2. The system of claim 1, wherein one or more of the at least one processor circuit is to:
   determine that the video chunk of the plurality of video chunks is not completed; and
   download the chunk location box at the end of each video chunk of the plurality of video chunks.

3. The system of claim 1, wherein one or more of the at least one processor circuit is to:
   determine that the video chunk of the plurality of video chunk is completed; and
   download the video chunk.

4. The system of claim 1, wherein the chunk location box includes a chunk index, a chunk offset, and a chunk size.

5. The system of claim 1, wherein the chunk location box assigns a range of bytes to a chunk index, and the range of bytes indicates the location and size of the video chunk.

6. The system of claim 5, wherein the completion check on the video chunk is based on the range of bytes assigned to the chunk index.

7. The system of claim 5, wherein the video chunk is determined to be not completed based on the range of bytes being unavailable in the chunk indexing table.

8. The system of claim 5, wherein the video chunk is determined to be completed based on the range of bytes being available in the chunk indexing table.

9. The system of claim 1, wherein the video chunk is a Common Media Application Format (CMAF) video chunk.

10. A non-transitory computer-readable medium comprising computer-executable instructions to cause at least one processor circuit to at least:

determine a viewpoint change from a first segment to a second segment of a video stream, wherein each segment includes a plurality of video chunks;

download a chunk location box at an end of each video chunk of the plurality of video chunks;

parse the chunk location box to update a chunk indexing table; and perform a completion check on a video chunk of the plurality of video chunks.

11. The non-transitory computer-readable medium of claim 10, wherein the instructions are to cause one or more of the at least one processor circuit to:

determine that the video chunk of the plurality of video chunk is completed; and download the video chunk.

12. The non-transitory computer-readable medium of claim 10, wherein the chunk location box assigns a range of bytes to a chunk index, and the range of bytes indicates the location and size of the video chunk.

13. The non-transitory computer-readable medium of claim 12, wherein the completion check on the video chunk is based on the range of bytes assigned to the chunk index.

14. The non-transitory computer-readable medium of claim 12, wherein the video chunk is determined to be not completed based on the range of bytes being unavailable in the chunk indexing table.

15. The non-transitory computer-readable medium of claim 12, wherein the video chunk is determined to be completed based on the range of bytes being available in the chunk indexing table.

16. A method comprising:

determining, by one or more processor circuits, a viewpoint change from a first segment to a second segment of a video stream, each segment including a plurality of video chunks;

downloading a chunk location box at an end of each video chunk of the plurality of video chunks;

parsing the chunk location box to update a chunk indexing table; and performing a completion check on a video chunk of the plurality of video chunks.

17. The method of claim 16, wherein the chunk location box assigns a range of bytes to a chunk index, and the range of bytes indicates the location and size of the video chunk.

18. The method of claim 17, wherein the completion check on the video chunk is based on the range of bytes assigned to the chunk index.

19. The method of claim 17, wherein the video chunk is determined to be not completed based on the range of bytes being unavailable in the chunk indexing table.

20. The method of claim 17, wherein the video chunk is determined to be completed based on the range of bytes being available in the chunk indexing table.

* * * * *